(12) United States Patent
Wolf

(10) Patent No.: US 6,766,931 B2
(45) Date of Patent: Jul. 27, 2004

(54) GROCERY-STORE SHOPPING CART FACILITATING DIVERSE-CONDITION CARTAGE

(76) Inventor: Margrit Wolf, A-34 Elite Dr., Genoa City, WI (US) 53128

( * ) Notice: Subject to any disclaimer, the term of this patent is extended or adjusted under 35 U.S.C. 154(b) by 0 days.

(21) Appl. No.: 09/812,918

(22) Filed: Mar. 20, 2001

(65) Prior Publication Data

US 2002/0134806 A1 Sep. 26, 2002

(51) Int. Cl.$^7$ ............................................... B60R 7/00
(52) U.S. Cl. ............ 224/411; 280/33.991; 280/33.992; 280/33.993
(58) Field of Search ................... 224/411; 280/33.991, 280/33.992, 33.993; 206/545, 546; 383/110; 220/592.03, 592.08, 592.09

(56) References Cited

U.S. PATENT DOCUMENTS

| | | | | |
|---|---|---|---|---|
| 1,481,170 A | * | 1/1924 | Wompey | 220/592.09 |
| 2,596,037 A | * | 5/1952 | Maniscalco | 62/449 |
| 2,663,157 A | * | 12/1953 | Laramy | 62/329 |
| 4,128,170 A | * | 12/1978 | Elliott | 206/315.11 |
| 4,376,502 A | * | 3/1983 | Cohen | 224/411 |
| 4,560,096 A | * | 12/1985 | Lucas et al. | 220/9.4 |
| 4,577,475 A | * | 3/1986 | Herrera | 62/457.1 |
| 4,643,280 A | * | 2/1987 | Hensley | 108/44 |
| 4,871,100 A | * | 10/1989 | Posner | 224/411 |
| 4,966,318 A | * | 10/1990 | Dutka | 206/425 |
| 4,989,767 A | * | 2/1991 | Buschbom | 224/274 |
| 5,002,292 A | * | 3/1991 | Myers | 280/33.992 |
| 5,012,966 A | * | 5/1991 | Turner et al. | 224/277 |
| 5,048,639 A | * | 9/1991 | Scherer | 182/18 |
| 5,169,164 A | | 12/1992 | Bradford | |
| 5,203,578 A | | 4/1993 | Davidson et al. | |
| 5,313,817 A | | 5/1994 | Meinders | |
| 5,494,308 A | * | 2/1996 | Southerland | 220/495.01 |
| 5,505,472 A | * | 4/1996 | Trubiano | 280/33.993 |
| 5,507,507 A | | 4/1996 | Davidson | |
| 5,533,361 A | * | 7/1996 | Halpern | 62/457.2 |
| 5,595,395 A | | 1/1997 | Wilson | |
| 5,622,276 A | * | 4/1997 | Simmons | 220/495.08 |
| 5,660,476 A | * | 8/1997 | DeCoster | 190/108 |
| D383,283 S | * | 9/1997 | Hankins, III | D34/27 |
| 5,683,097 A | | 11/1997 | Fenton et al. | |
| 5,836,596 A | | 11/1998 | Wanzl | |
| 5,961,133 A | | 10/1999 | Perry | |
| 6,234,677 B1 | * | 5/2001 | Mogil | 383/110 |
| 6,336,577 B1 | * | 1/2002 | Harris et al. | 224/153 |

* cited by examiner

*Primary Examiner*—Gregory Vidovich
*Assistant Examiner*—Maerena W. Brevard
(74) *Attorney, Agent, or Firm*—Jansson, Shupe & Munger, Ltd.

(57) ABSTRACT

A grocery-store shopping cart having a main container and an insulated inner container detachably secured within the main container and positioned substantially entirely below the plane of the main-container top edge and adjacent to one endwall thereof to leave substantial storage volume in the main container but outside the inner container, to facilitate diverse-condition grocery cartage. Preferred features include: the inner container being flush with or recessed below the plane to avoid interference during nesting; a hinged cover; and equal acute angles between (1) a main-container endwall and the plane and (2) an inner-container wall and the inner-container top.

17 Claims, 5 Drawing Sheets

GROCERY-STORE SHOPPING CART FACILITATING DIVERSE-CONDITION CARTAGE

FIELD OF THE INVENTION

The present invention relates to carts and, more particularly, to grocery-store shopping carts.

BACKGROUND OF THE INVENTION

Since fairly early in the twentieth century, grocery shopping has predominantly been carried out by shoppers pushing grocery-store shopping carts up and down the aisles of ordinary food stores or supermarkets.

Shoppers make selections at various places along aisle after aisle of shelves, glass-doored freezer units, open-topped or upright coolers, produce racks and the like, all laden with many food items from which to choose. Shoppers select food items, whether displayed at room temperature, cooled or frozen, and place them in their carts, often during extended shopping periods, and then wheel them to check-out counters for ultimate bagging and removal from the store for transport, usually via automobile, to the shoppers' destinations.

Such grocery-store shopping carts each typically have a large open-top container in which to store a large quantity of diverse food items, usually in jumbled fashion, with no particular organization whatsoever as to type of item or even as to appropriate storage temperature. Such open-top container typically has a substantially planar base bounded by front and rear endwalls and two sidewalls all terminating in a quadrilateral top edge which defines a plane. The planar base and the walls in most cases are formed of a lattice-work of thin metal rods or bars, giving the container a general openness.

The front endwall of the typical grocery-store shopping cart is often tilted forward (in a bottom-to-top direction); that is, the front endwall is at an acute angle with the plane formed by the quadrilateral top edge of the container. Likewise, in some cases the container sidewalls of the grocery-store shopping cart are also tilted slightly outwardly (in a bottom-to-top direction) so that they are wider apart at the top of the container than at the bottom. Either or both of these features help make the open top wider than the base, thereby allowing storage of larger collections of groceries than would otherwise be the case.

Because of the large size of the cart and the large number of such carts which must be stored at the grocery store or supermarket when not in use, such carts typically are built to be horizontally nestable with one another. This is typically accomplished by having the rear endwall of the container of each cart hinged (at the top of the rear endwall) so that it can swing upwardly to receive the front end of the container of an identical cart. The sidewalls of each container are tapered slightly toward one another (in a rear-to-front direction) such that the front of the container of one cart can readily be received into the rear of the container of another cart. When this occurs upon nesting, the rear endwall of one cart engages and slides along the quadrilateral top edge of the container walls of another cart.

Cooled and/or frozen foods all jumbled together with room-temperature foods, packaged or otherwise, and even perhaps with some hot prepared foods will not be maintained at their desirable or appropriate storage temperatures, particularly during extended grocery shopping. As can readily be seen, this can be problematic, because maintaining acceptable storage temperatures is important for reasons related to health and/or food-storage longevity. While foods typically may not spoil immediately, of course, even temporary storage at temperatures which are too high will tend to shorten the time before eventually spoilage, even if stored at home at appropriate cool or cold temperatures. Maintaining freshness of food is of great importance.

Using typical grocery-store shopping carts of the prior art can tend to cause food spoilage problems not only because of improper storage during shopping, but can tend to increase the likelihood of such problems in other ways. More specifically, such shopping carts of the prior art, with their jumbled presentation of cool, frozen and room-temperature foods at the check-out counter, can tend to discourage conscious efforts by check-out personnel to at least group cool-temperature foods together upon bagging for the purpose of enhancing their protection during the trip home.

Sub-containers used within the main containers of shopping carts can interfere too much with storage in the space which is outside the sub-container but within the main container. The use of sub-containers also can tend to interfere too much with a grocer's established patterns for providing carts for shoppers. For example, without appropriate configuring, there could be excessive interference with nesting of grocery-store shopping carts and cleaning shopping-cart equipment from time to time as needed could become too problematic.

From a grocer's perspective, shopping-cart improvements of a type which could increase the duration of a shopper's total shopping time, such as would tend to occur with apparent protection for the condition of cool and frozen foods, would be desirable—as allowing greater time for influencing positive purchasing decisions by shoppers.

While certain improvements have been made in grocery-store shopping carts, there has remained a need for improved grocery-store shopping carts which accommodate the need of shoppers for temporary storage of varying groceries under diverse conditions and the needs of the grocer for easy storage and maintenance.

OBJECTS OF THE INVENTION

It is a primary object of this invention to provide an improved grocery-store shopping cart overcoming problems and shortcomings of the prior art, including those mentioned above.

Another object of this invention is to provide an improved grocery-store shopping cart which facilitates the thermal protection of cool and frozen foods.

Another object of this invention is to provide an improved grocery-store shopping cart which minimizes the likelihood of food spoilage because of insufficient thermal protection of cold and frozen foods.

Another object of this invention is to provide an improved grocery-store shopping cart which facilitates temporary storage of diverse groceries under different conditions.

Another object of this invention is to provide an improved grocery-store shopping cart which can be used easily by shoppers and grocers and serves to extend the usable life foods after they have been transported to a shopper's refrigerator.

Still another object of this invention is to provide an improved grocery-store shopping cart which facilitates segregated temporary thermal protection of cold foods during shopping.

Yet another object is to provide a grocery-store shopping cart which has improved capability for carrying diverse groceries under varying conditions and is also readily and conveniently stored by grocers between uses by shoppers.

Another object is to provide a grocery-store shopping cart with diverse-thermal-condition food storage which can be readily cleaned and maintained from time to time by grocers.

Still another object of the invention is to provide an improved grocery-store shopping cart which can tend to increase the duration of a shoppers' presence at the grocery store or supermarket.

Another object of the invention is to provide an improved grocery-store shopping cart which increases the likelihood of proper thermal packaging of groceries upon check-out.

These and other objects of the invention will be apparent from the following descriptions and from the drawings.

SUMMARY OF THE INVENTION

The grocery-store shopping cart of this invention overcomes the problems and shortcomings noted above and achieves the objects of this invention. The inventive shopping cart is an improvement in the type of grocery-store shopping cart which has a main container with a substantially planar base bounded by front and rear endwalls and two sidewalls all terminating in a quadrilateral top edge which defines a plane.

The improved shopping cart has an insulated inner container which is within the main container and detachably secured to the main container, and which is positioned substantially entirely below the plane and adjacent to only one endwall of the main container to leave substantial remaining storage volume in the main container but outside the inner container. This invention facilitates diverse-condition cartage of groceries for the user, and facilitates the provision of such shopping-cart advantages for grocers.

In certain highly preferred embodiments, the inner container of the shopping cart has a hinged cover. Preferably, the inner container has a top which is substantially flush with the plane formed by the top edge of the main-container walls, and such top is preferably a hinged cover.

In certain highly preferred embodiments, one of the main-container endwalls is at an acute angle to the plane and the inner container has (a) one inner-container wall substantially parallel to and against such one main-container endwall and (b) a top at an acute angle to such one inner-container wall and substantially parallel to the plane.

In the most highly preferred embodiments of this type, the main-container front endwall is at an acute angle to the plane formed by the top edge of the main-container walls, and the inner container has (a) an inner-container front wall substantially parallel to and against the main-container front endwall and (b) a top at an acute angle to the inner-container front wall and substantially parallel to the plane.

The inner container preferably has, or also has, a pair of spaced inner-container sidewalls each substantially parallel to and against one of the main-container sidewalls. In certain highly preferred embodiments of this invention, the inner container has a lower wall with a bottom against the main-container base, and the inner-container top is flush or substantially flush with the plane.

Certain additional features of highly preferred embodiments of this invention are further helpful in making the diverse-thermal-condition cartage advantage of this invention readily and conveniently usable by grocers—in fact, usable with minimal changes in their shopping-cart storage and maintenance routines. In particular, typical cart nesting may be facilitated by certain features and cleaning and maintenance are facilitated by other features.

More specifically, the main-container rear endwall is hinged, as is typical, in order to swing upwardly and rest on the top edge of a second similar shopping cart when the carts are horizontally nested, and the inner container is recessed below the plane in order to avoid any interference during such nesting. Also, the inner-container lower wall preferably has an opening therethrough which is closed by a removable stopper, thereby to facilitate washing from time to time as may be needed. Washing can be carried out easily, whether by hosing the inner containers in place, or by removing them, hosing them, and then reattaching them in their main containers.

The size of the smaller insulated inner container relative to the main container can vary significantly. An appropriate choice depends on what the typical volume of refrigerated groceries purchased might be to the typical volume of non-refrigerated groceries purchased—by the typical shopper.

DETAILED DESCRIPTION OF PREFERRED EMBODIMENTS

Figure 1:
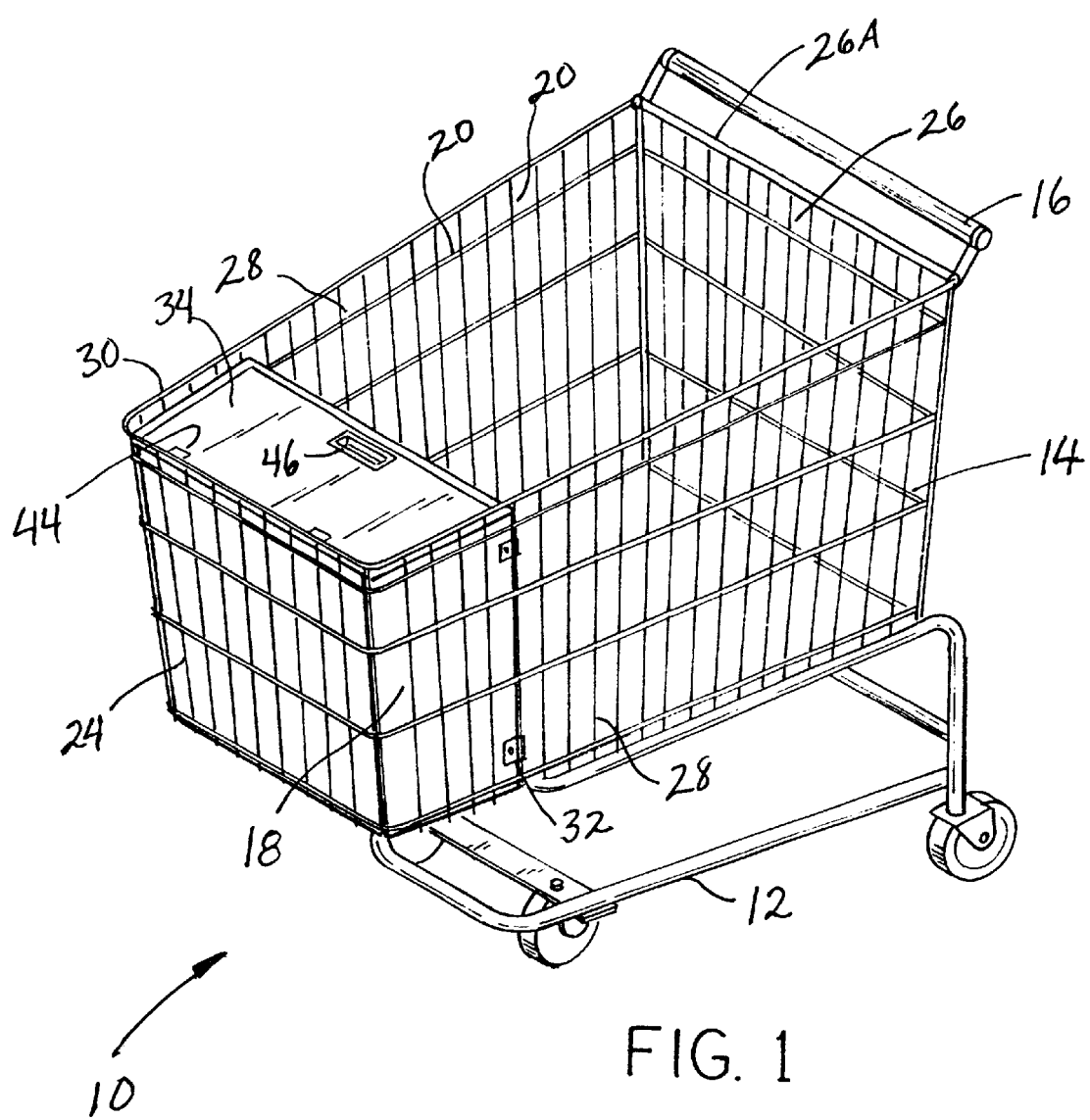
FIG. 1 is a perspective view of a preferred grocery-store shopping cart in accordance with this invention.

The drawing figures illustrate a preferred improved grocery-store shopping cart 10 in accordance with this invention, and various parts thereof. The principal parts of shopping cart 10 are a main container 14 and an insulated inner container 18, and various characteristics, requirements and relationships which together constitute the invention and provide its significant advantages as described herein.

Shopping cart 10 includes, in addition to main container 14 and insulated inner container 18, a wheeled undercarriage 12 which supports main container 14, and a push handle 16 at the rear end of and extending from main container 14. Main container 14, as with the containers of many prior grocery-store shopping carts, is a rigid open structure of interconnected metal rods 20, and undercarriage 12 is formed of larger metal bars, one or more cross-pieces, wheel supports, and wheels, which need not be identified by numbers.

Main container 14 includes a substantially planar base 22 which is bounded by upstanding front and rear endwalls 24 and 26, respectively, and two opposed sidewalls 28, each of which extends between front and rear endwalls 24 and 26. Front and rear endwalls 24 and 26 and sidewalls 28 all terminate in a quadrilateral top edge 30 which defines a plane.

Insulated inner container 18 is within main container 14 and is detachably secured to main container 14. While such detachable securement may be accomplished in a variety of ways, in the illustrated embodiment such detachable securement is by means of a pair of connectors 32 which extend from main-container sidewalls 28 to engage inner-container sidewalls 40, thereby to hold inner container 18 and in place during shopping. Connectors 32 may be velcro pads each of which extends around one of rods 40 forming one of the main-container sidewalls 28 and engages a velcro attachment member (not shown) located on inner-container sidewall 40 near the rear edge thereof. Alternative connectors could be tape strips, or small screw plates and screws. Still another alternative is a rod extending across main container 14 from one main-container sidewall 28 to the other main-container sidewall 28, along and in contact with inner-container rear wall 38 of inner container 18. Any and all of these connector means allow easy detachment, so that inner container 18 can not only be held in the intended position within main container 14, but can be removed from main container 14, such as for cleaning or replacement.

Inner container 18, as shown best in FIGS. 2, 3, 4A–C and 5A–C, includes a top cover 34, a front wall 36, a rear wall 38, a pair of opposed sidewalls 40, and a lower wall 42. A number of particular angles and relationships exist between various walls and portions of main container 14 and insulated inner container 18, as now described.

Figure 4A:
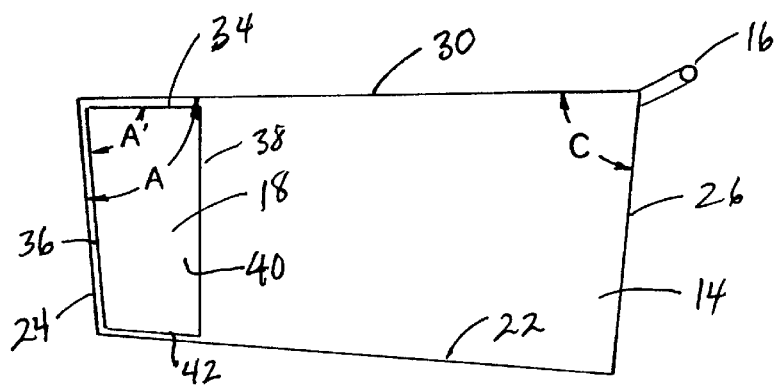
FIG. 4A is a schematic side elevation of the shopping cart main container and the insulated inner container therein, illustrating relationships therebetween.

As illustrated in FIGS. 1, 4A–C and 6, main-container front endwall 24 is oriented at an acute angle with respect to the plane formed by top edge 30 of main container 14, and inner-container front wall 36 is oriented at a similar acute angle with respect to top cover 34 of inner container 18. Inner-container front wall 36 is parallel to and against main-container front endwall 24, and top cover 34 of inner container 18 is parallel to the plane of top edge 30 of main container 14. This is shown best in FIG. 4A, in which angle A represents the angle between main-container front endwall 24 and the plane formed by top edge 30 of main container 14, and angle A' represents the angle between inner-container front wall 36 and inner-container top cover 34. Angle A' equals angle A. FIG. 4A also illustrates that main-container rear endwall 26 is oriented at an acute angle (angle C) with respect to the plane formed by top edge 30 of main container 14.

Figure 4B:
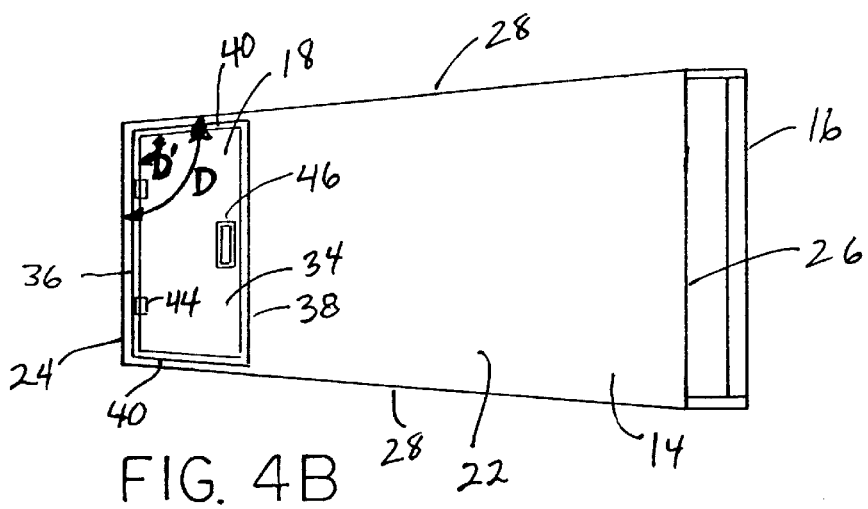
FIG. 4B is a schematic top plan view of the same combination, illustrating further relationships between the main container and the insulated inner container.
Figure 4C:
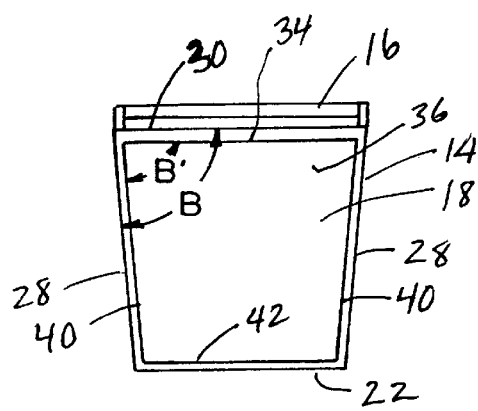
FIG. 4C is a schematic front elevation of the same combination, serving to illustrate further relationships between such elements.

By viewing shopping cart 10 from the front as illustrated best in schematic FIG. 4C, it can be seen that inner-container sidewalls 40 have the same acute angular relationships to inner-container top cover 34 that main-container sidewalls 28 have to top edge 30 of inner container 14. That is, angle B' equals angle B, and inner-container sidewalls 40 are parallel to and in contact with main-container sidewalls 28. It can also be seen that inner-container lower wall 42 has a bottom surface which is against and flush with planar base 22 of main container 14.

In the same manner, as illustrated best in FIG. 4B, angle D' represents the angle between inner-container front wall 36 and one of inner-container sidewalls 40, while angle D represents the angle between main-container front endwall 24 and one of main-container sidewalls 28. Angle D' is equal to angle D, and each inner-container sidewall 40 is parallel to and in contact with a main-container sidewall 28.

In other words, the angles between each adjoining pair of adjacent inner-container walls (including both the substantially vertical front wall 36, sidewalls 40, and rear wall 38, and the generally horizontal lower wall 42 and top cover 34) match the angles between each corresponding adjoining pair of main-container walls (front endwall 24, sidewalls 28, rear endwall 26, planar base 22, and the plane formed by top edge 30 of inner container 14). These relationships facilitate substantially complete nesting of inner container 18 with main container 14 and allow substantial remaining storage volume in main container 14 (i.e., outside of insulated inner container 18).

Insulated inner container 18 is positioned entirely below the plane formed by top edge 30 of main container 14. Top cover 34 of inner container 18 is slightly recessed below top edge 30, in a position which is also substantially flush with the plane formed by top edge 30. This flush, slightly recessed positioning is useful in facilitating the nesting of grocery-store shopping cart 10 with other identical carts.

Figure 6:
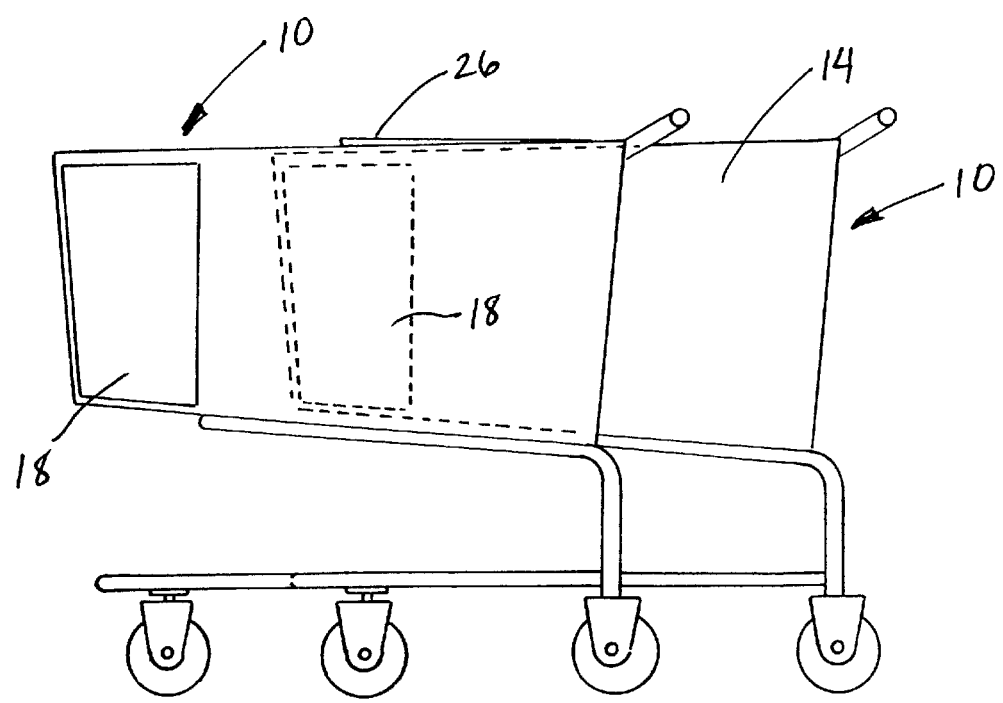
FIG. 6 is a schematic drawing of two identical carts in accordance with this invention, nested together for storage and awaiting use.

More specifically, main-container rear endwall 26 is free to pivot inwardly about its top edge 26A—i.e., inwardly and into main container 14 to allow the front portion of the main container of an identical shopping cart to be inserted into such main container 14 from the rear, as illustrated in FIG. 6. The slight recessing of inner container 18 into main container 14 means that main-container rear endwall 26, when it drags across top edge 30 of an identical cart to the rear, will not come into contact with such identical cart's inner container 18. Thus, the presence of inner containers 18 in a number of similar grocery store shopping carts will not detract from the normal nesting storage of such carts when they are between uses at a grocery store or supermarket. Furthermore, the forwardmost position of inner container 18 in main container 14 facilitates nesting.

Figure 2:
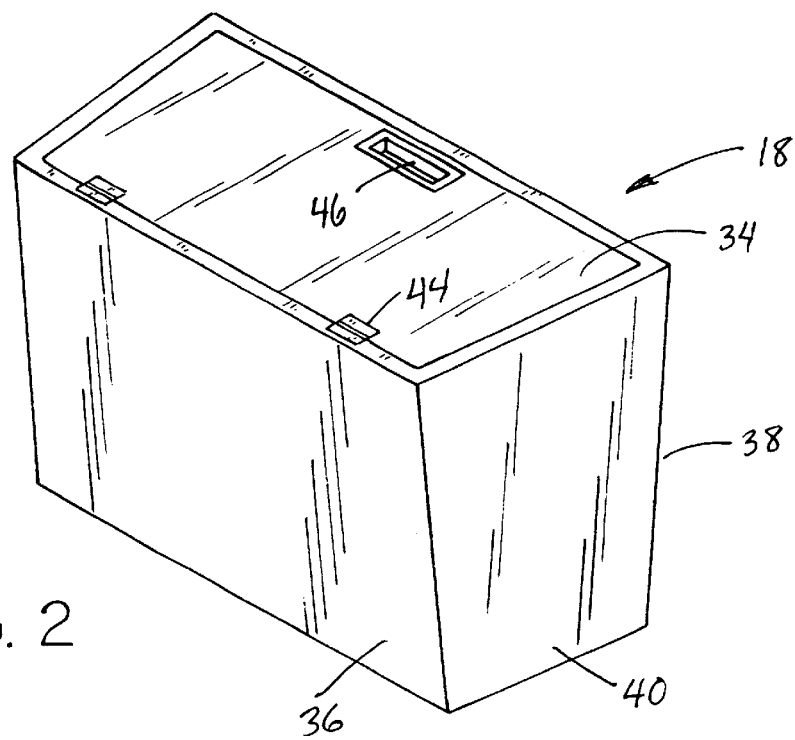
FIG. 2 is a perspective view of the insulated inner container portion of the device of FIG. 1.
Figure 3:
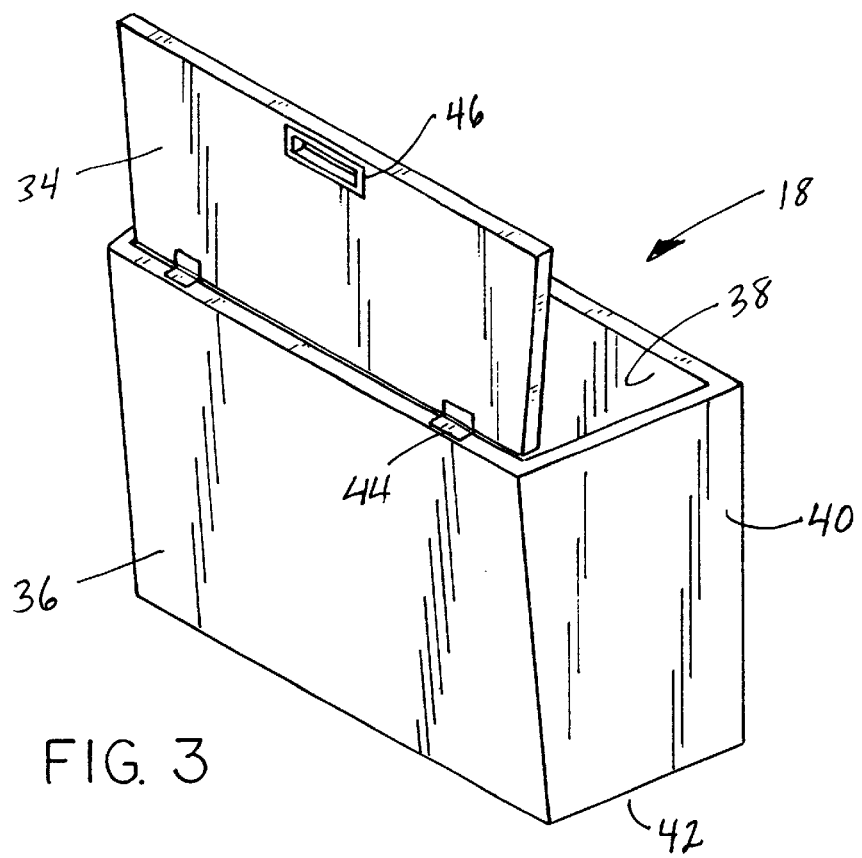
FIG. 3 is another perspective view as in FIG. 2, but showing the cover of the insulated inner container pivoted to an open position.
Figure 5A:
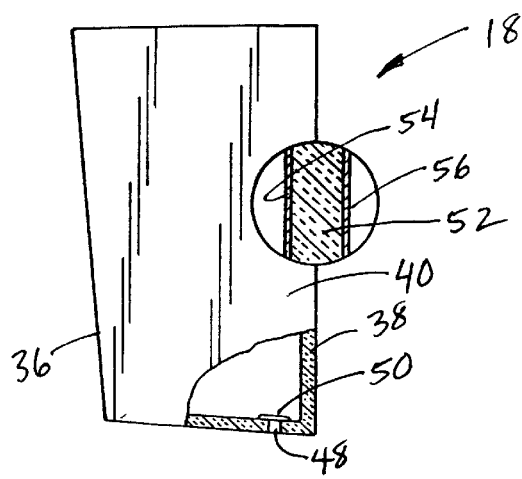
FIG. 5A is a side elevation of the insulated inner container, partially broken away and having a magnified fragmentary portion to illustrate details of the structure.
Figure 5B:
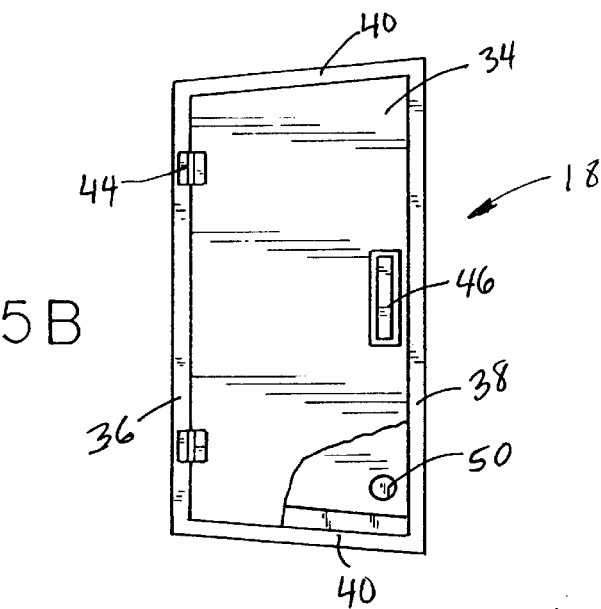
FIG. 5B is a partially broken away top view of FIG. 5A.
Figure 5C:
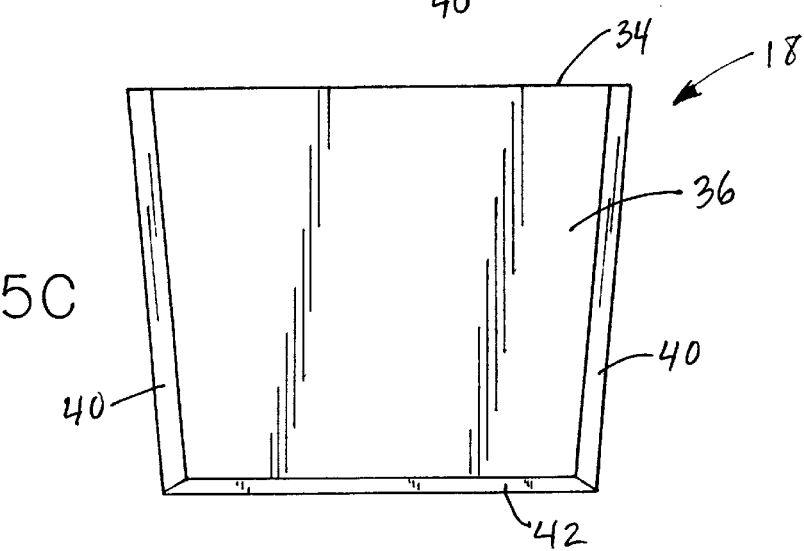
FIG. 5C is a front view of the device of FIG. 5A, i.e., a left side view of FIG. 5A.

As illustrated best in FIGS. 2, 3 and 5B, top cover 34 of insulated inner container 18 is hinged to inner container front wall 36 along the upper edge thereof, by means of hinges 44. Top cover 34 may be lifted by means of recessed handle 46 formed therein. Hinges 44 may be in any known form, including plastic or cloth strips.

As illustrated best in FIGS. 5A and 5B, inner-container lower wall 32 has a drain hole 48 near one corner thereof which is closed by a plug 50. Drain hole 48 facilitates washing of inner container 18 by allowing drainage of water therefrom, and plug 50 serves to prevent excessive heat from entering insulated inner container 18 when it is used for storing cold or frozen foods.

As illustrated best in FIG. 5A, the walls of insulated inner container 18 are preferably formed of an insulating inner material 52, such as polyurethane foam or the like, and tough inner and outer skins 54 and 56, respectively. Inner and outer skins 54 and 56 may be made of appropriate plastic or other materials. A wide variety of well-known insulating and wall materials can be used for inner container 18.

Grocery-store shopping cart serves shoppers well by allowing proper storage of cold and frozen foods, and also accommodates the needs of grocers to provide such advantages without imposing undue burdens on operation of the grocery store or supermarket. When a shopper arrives at the check-out counter, all cold and frozen foods can be rung up first, as a group. This allows immediate packaging of cold and frozen foods in appropriate packaging for transport to their destinations.

While the principles of this invention have been described in connection with specific embodiments, it should be understood clearly that these descriptions are made only by way of example and are not intended to limit the scope of the invention.

What is claimed is:

1. In a grocery-store shopping cart having a main container with a substantially planar base bounded by front and rear endwalls and two sidewalls all terminating in a quadrilateral top edge which defines a plane, the improvement comprising an insulated inner container within the main container and detachably secured thereto, the inner container having a top cover, a front wall, a rear wall, a pair of opposed sidewalls, and a lower wall, the walls being of fixed form and orientation, the lower wall having an opening therethrough closed by a removable stopper, thereby to facilitate washing, and the inner container being positioned substantially entirely below the plane and adjacent to only one endwall to leave substantial remaining storage volume in the main container but outside the inner container, thereby to facilitate diverse-condition cartage of groceries.

2. The grocery-store shopping cart of claim 1 wherein the walls and top cover of the inner container are formed from polyurethane foam with tough inner and outer skins thereon.

3. In a grocery-store shopping cart having a main container with a substantially planar base bounded by front and rear endwalls and two sidewalls all terminating in a quadrilateral top edge which defines a plane, the improvement comprising an insulated inner container within the main container and detachably secured thereto, the inner container having a top cover, a front wall, a rear wall, a pair of opposed sidewalls, and a lower wall, the walls being of fixed form and orientation, and the inner container being positioned substantially entirely below the plane and adjacent to only one endwall to leave substantial remaining storage volume in the main container but outside the inner container, thereby to facilitate diverse-condition cartage of groceries, and wherein (a) the rear endwall of the main container is hinged to swing upwardly and rest on the top edge of a second similar shopping cart when the carts are horizontally nested and (b) the inner container is at least slightly recessed below the plane, thereby to avoid any interference during such nesting.

4. The grocery-store shopping cart of claim 3 wherein the top cover is a hinged insulated cover.

5. The grocery-store shopping cart of claim 3 wherein the top cover is substantially flush with the plane.

6. The grocery-store shopping cart of claim 3 wherein:
one of the endwalls of the main container is at an acute angle to the plane;
of the walls of the inner container is substantially parallel to and against said one endwall of the main container; and
the top cover is at an acute angle to said one wall of the inner container and substantially parallel to the plane.

7. The grocery-store shopping cart of claim 3 wherein:
the front endwall of the main container is at an acute angle to the plane;
the front wall of the inner container is substantially parallel to and against the front endwall of the main container; and
the top cover is at an angle to the front wall of the inner container and substantially parallel to the plane.

8. The grocery-store shopping cart of claim 7 wherein:
the lower wall has a bottom against the base of the main container; and
the top cover is substantially flush with the plane.

9. The grocery-store shopping cart of claim 8 wherein the lower wall has an opening therethrough closed by a removable stopper, thereby to facilitate washing.

10. The grocery-store shopping cart of the claim 3 wherein the walls and top cover of the inner container are formed from polyurethane foam with tough inner and outer skins thereon.

11. In a grocery-store shopping cart having a main container with a substantially planar base bounded by front and rear endwalls and two sidewalls all terminating in a quadrilateral top edge which defines a plane, the improvement comprising an insulated inner container within the main container and detachably secured thereto, the inner container having a top cover, a front wall, a rear wall, a pair of opposed sidewall; and a lower wall, the walls being of fixed form and orientation, and the inner container being positioned substantially entirely below the plane and adjacent to only one endwall to leave substantial remaining storage volume in the main container but outside the inner container, thereby to facilitate diverse-condition cartage of groceries.

12. The grocery-store shopping cart of claim 11 wherein the top cover is a hinged insulated cover.

13. The grocery-store shopping cart of claim 12 wherein the top cover is substantially flush wit the plane.

14. The grocery-store shopping cart of claim 13 wherein:
the front endwall of the main container is at an acute angle to the plane;
the front wall of the inner container is substantially parallel to and against the front endwall of the main container; and
the top cover is at an acute angle to the front wall of the inner container and substantially parallel to the plane.

15. The grocery-store shopping cart of claim 14 wherein:
the lower wall has a bottom against the base of the main container; and
the top cover is substantially flush with the plane.

16. The grocery-store shopping cart of claim 15 wherein the walls and top cover of inner container are formed from polyurethane foam.

17. The grocery-store shopping cart of claim 16 wherein the walls and top cover have tough inner and outer skins.

* * * * *

UNITED STATES PATENT AND TRADEMARK OFFICE
CERTIFICATE OF CORRECTION

PATENT NO. : 6,766,931 B2  
DATED : July 27, 2004  
INVENTOR(S) : Margrit Wolf

It is certified that error appears in the above-identified patent and that said Letters Patent is hereby corrected as shown below:

Column 7,  
Line 53, add the word -- one -- as the first word in that line;

Column 8,  
Line 38, delete the word "wit" and replace with the word -- with --.

Signed and Sealed this

Twenty-eighth Day of September, 2004

JON W. DUDAS  
*Director of the United States Patent and Trademark Office*